(12) United States Patent  
Schulstad

(10) Patent No.: US 7,418,635 B2  
(45) Date of Patent: Aug. 26, 2008

(54) AUTOMATICALLY TRIGGERED SNAPSHOT DATA DUMP FOR STORAGE UNIT WITH EMBEDDED SYSTEM

(75) Inventor: Geir Olav Schulstad, Lovenstad (NO)

(73) Assignee: Tandberg Storage ASA, Oslo (NO)

( * ) Notice: Subject to any disclaimer, the term of this patent is extended or adjusted under 35 U.S.C. 154(b) by 585 days.

(21) Appl. No.: 11/042,966

(22) Filed: Jan. 25, 2005

(65) Prior Publication Data

US 2006/0168471 A1    Jul. 27, 2006

(51) Int. Cl.  
G06F 11/00    (2006.01)

(52) U.S. Cl. .......................................... 714/45; 714/42

(58) Field of Classification Search .................... None  
See application file for complete search history.

(56) References Cited

U.S. PATENT DOCUMENTS

| | | | |
|---|---|---|---|
| 4,253,183 A | | 2/1981 | Taylor et al. |
| 5,271,019 A | | 12/1993 | Edwards et al. |
| 5,293,612 A | * | 3/1994 | Shingai ...................... 711/159 |
| 5,535,310 A | * | 7/1996 | Michel ...................... 358/1.14 |
| 6,226,761 B1 | | 5/2001 | Berstis |
| 6,434,499 B1 | * | 8/2002 | Ulrich et al. ................ 702/115 |
| 6,438,715 B1 | * | 8/2002 | Assouad ...................... 714/45 |
| 6,467,054 B1 | * | 10/2002 | Lenny ........................ 714/42 |
| 6,493,656 B1 | * | 12/2002 | Houston et al. ............. 702/187 |
| 6,600,614 B2 | * | 7/2003 | Lenny et al. .................. 360/31 |
| 6,691,250 B1 | | 2/2004 | Chandiramani et al. |
| 6,813,731 B2 | * | 11/2004 | Zahavi et al. ................. 714/45 |
| 7,069,479 B2 | * | 6/2006 | Hester et al. ................. 714/45 |
| 7,293,203 B1 | * | 11/2007 | Coatney et al. ............... 714/42 |
| 2004/0078720 A1 | * | 4/2004 | Ito et al. ....................... 714/45 |
| 2004/0236820 A1 | | 11/2004 | Flocken |
| 2005/0034012 A1 | * | 2/2005 | Bartlett et al. ................. 714/5 |

FOREIGN PATENT DOCUMENTS

DE         41 26 465        8/1992

OTHER PUBLICATIONS

Maintenance Procedures Using Maintenance Log Functions—Technical Disclousre Bulletin vol. 33, No. 1A Jun. 1990.  
Tandberg Printout "Tandberg SLR140" Three Pages Dec. 16, 2004.

* cited by examiner

*Primary Examiner*—Gabriel L Chu  
(74) *Attorney, Agent, or Firm*—Schiff Hardin LLP

(57) ABSTRACT

In a system and method for failure analysis of a hardware system having an embedded specialized application computer as a firmware stored in a firmware memory and which controls and is part of the hardware system, with a snapshot dump system associated with the hardware system, detecting for an error. Upon detection of the error, a snapshot dump is initiated from memory locations providing information about conditions occurring during the error. The dumped information is stored in a memory associated with the dump system.

33 Claims, 4 Drawing Sheets

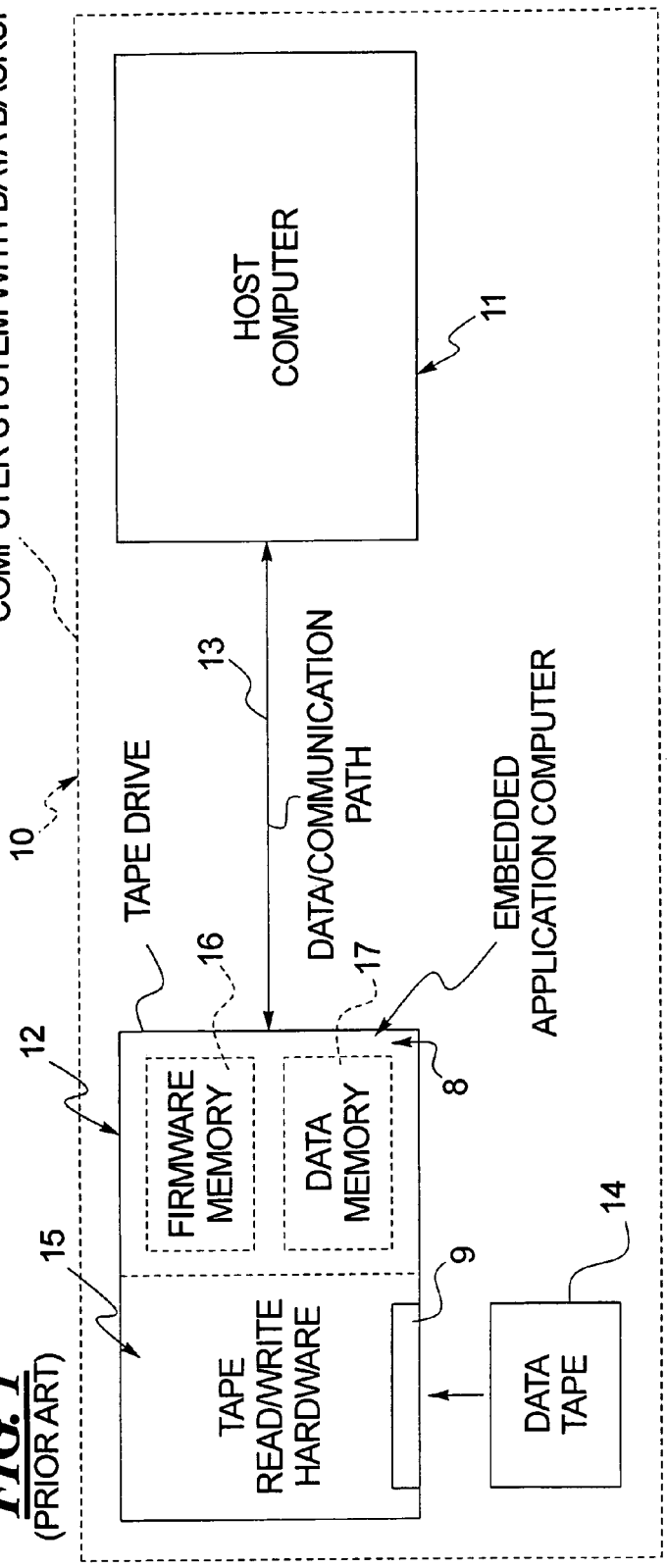
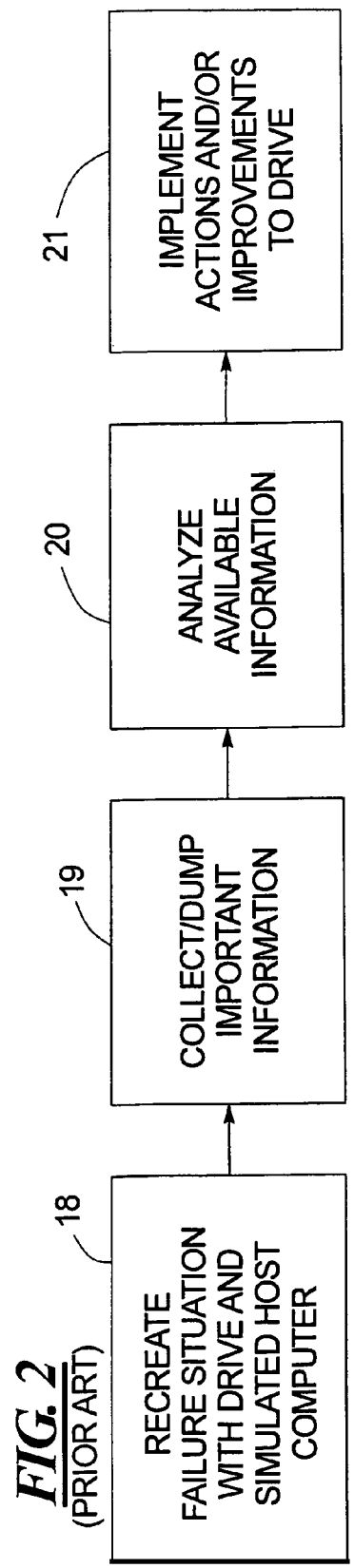

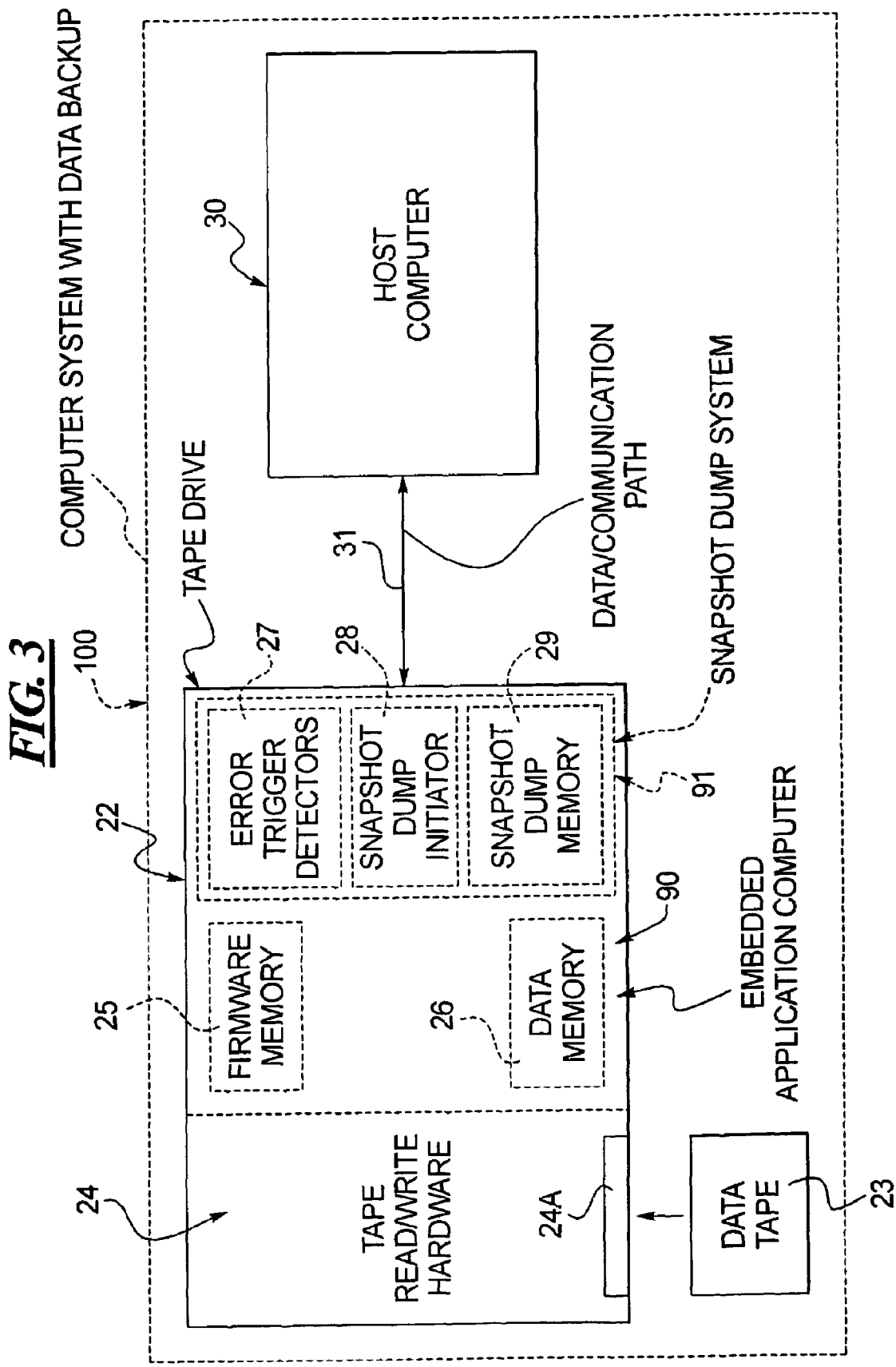

AUTOMATICALLY TRIGGERED SNAPSHOT DATA DUMP FOR STORAGE UNIT WITH EMBEDDED SYSTEM

BACKGROUND

As shown in prior art FIG. 1, it is known to provide a computer system 10 formed of a host computer 11 connected via a backup data/communication path 13 to a tape drive 12. To back up host system data, the tape drive 12 has a removable media 14, such as a data tape, which is insertable into the drive 12 via a loading slot 9. The drive 12 has tape read/write hardware 15 and an embedded specialized application computer 8 containing firmware stored in a firmware memory 16 and data stored in a data memory 17.

It is known that failures can occur in the data backed-up computer system 10 of FIG. 1. These failures can be of various types. For example, a malfunction may be caused by the tape read/write hardware, the firmware, data stored in the data, or errors may occur as a result of the data tape itself being damaged or having quality problems. Also, errors can occur if faulty instructions are sent from the host computer 11 to the tape drive 12.

The main issue when performing a failure analysis is a lack of proper and useful information concerning the problem. A vendor of the tape drive may spend a very significant amount of time investigating the root cause of different types of problems reported by the computer system with respect to the data backup tape drive. These problems may have to be recreated by the tape drive vendor at the vendor's own laboratory at a location from the host computer system being backed up with the tape drive. The host system may have to be simulated in a laboratory remote from the host computer system in order to catch the failure mode and events leading up to the failure. In many situations, different types of debugging tools must be provided and prepared at the time the failure occurs. This may result in the vendor of the tape drive spending inordinate amounts of time at the computer system user's location while the system is operating, which may interfere with operation of the host computer. Also extensive time may be required at the remote vendor's lab where the tape drive/host computer system is simulated in order to attempt to recreate the problems which have occurred. This process may take a long time and several retries before the correct information is trapped.

The tape drive vendor normally allocates people from its development laboratory for the failure analysis after it receives back the tape drive from the host computer system user's location.

In the prior art, previous experience was used by those in the laboratory combined with information dumped from the firmware memory and data memory of the returned tape drive in an attempt to solve the failure problem. However, information learned by such a memory dump would be stale and difficult to analyze since the information stored in the memory after the drive is returned is after-the-fact information, which has been rewritten, such as overwriting in buffer memories.

Based on previous experience, it was known in the prior art to solve problems occurring in the tape drives with the implemented embedded firmware systems along with development of comprehensive debugging tools based on event traces and different logs. This together with complete mapping of the firmware (both code and data), plus complete access to all hardware registers provided observability of what may have caused the problem. However, as explained above, the dump typically would not provide information stored in the memory at the actual time of the failure occurrence since as is known in the art, portions of a memory useful for the failure analysis dump are rewritten during continued operation of the tape drive after the error has occurred. Thus, since the people in the vendor's laboratory attempting to solve the failure problem are at a remote distance from the people where the actual problem occurred—namely the backed-up computer system user—valuable information is lost in view of the operating time which occurs after the failure and prior to transport of the tape drive to the vendor's laboratory for failure analysis.

Typically in the prior art, the tape drive vendor laboratory would have to begin from scratch in an attempt to simulate the host computer environment in which the tape drive failed at the user's location.

Furthermore, the backed-up computer system user is focused on doing their job and not understanding problems with the peripheral backup tape drive unit. Although the end users may be very accommodating to perform simple tasks in order to provide help, they do not like to interrupt their organization's use of the computer system for a very long time. For example, rebooting the computer system server in order to prepare for debugging tools is not a welcomed operation by the backed-up computer system user.

As shown in FIG. 2, with the prior art system it was thus first necessary, as shown at step 18, to recreate the failed system with the drive and either the host computer system or a simulation of the host computer system. Once the failure mode occurred, then it was necessary, as shown at 19, to dump and collect the dumped information from the firmware memory and data memory of the embedded computer 8. Thereafter the available information was analyzed as shown at 20, and then actions and/or improvements to the drive were implemented as shown at 21.

SUMMARY

It is an object to simplify failure analysis of a storage unit having an embedded specialized application computer system.

In a system and method for failure analysis of a hardware system having an embedded specialized application computer as a firmware stored in a firmware memory and which controls and is part of the hardware system, with a snapshot dump system associated with the hardware system detecting for an error. Upon detection of the error, a snapshot dump is initiated from memory locations providing information about conditions occurring during the error. The dumped information is stored in a memory associated with the dump system.

BRIEF DESCRIPTION OF THE DRAWINGS

FIG. 1 is a block diagram of a prior art host computer system having a data backup tape drive;

FIG. 2 is a block diagram showing prior art steps involved in a failure analysis for the tape drive of the system shown in FIG. 1;

FIG. 3 is a block diagram showing a tape drive having a snapshot dump system for simplifying a failure analysis of the tape drive when a failure has occurred in connection with operation with a host computer to which the tape drive is connected;

DESCRIPTION OF THE PREFERRED EMBODIMENT

Figure 4:
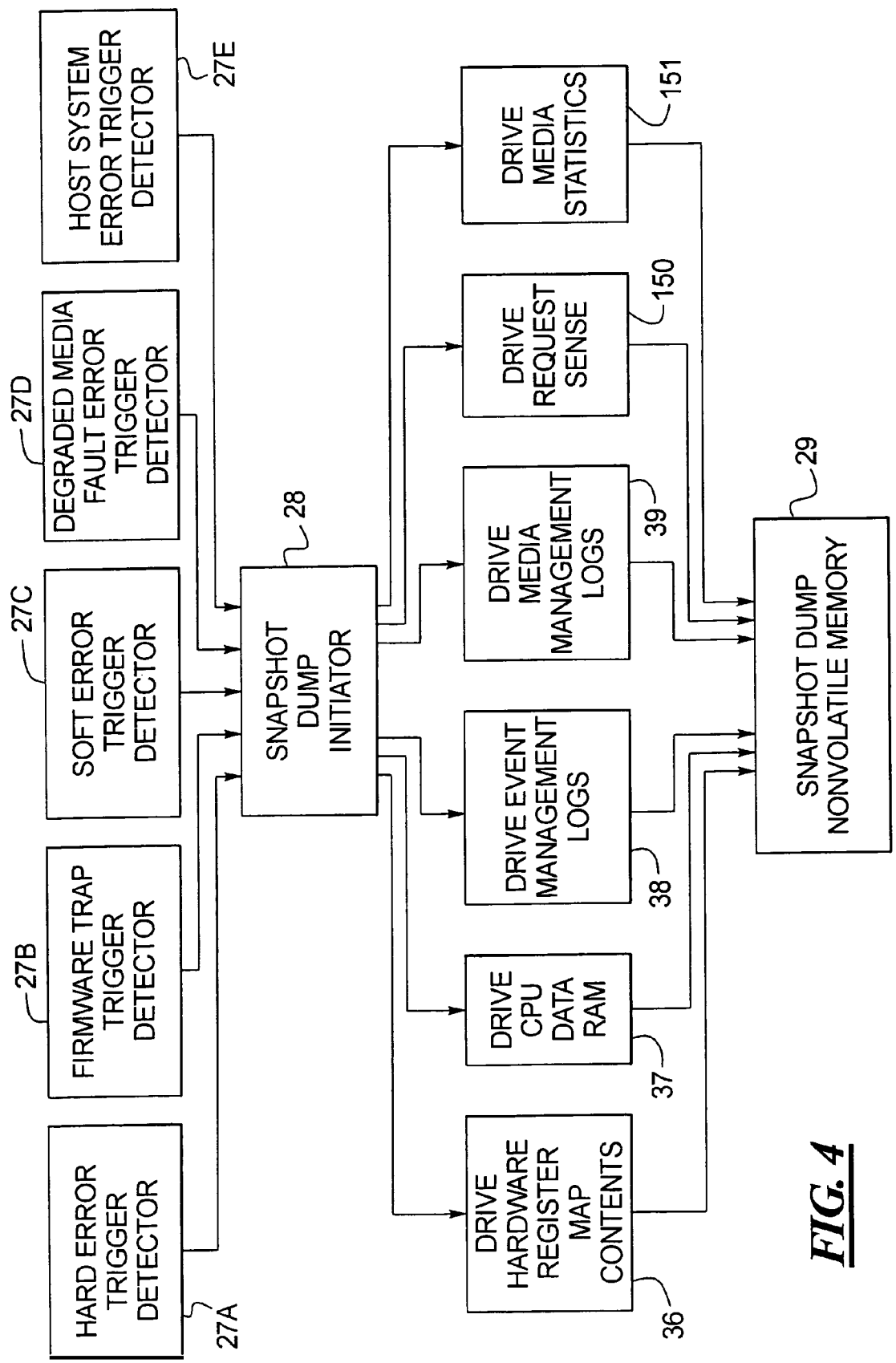
FIG. 4 shows steps performed by the snapshot dump system.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

As shown in FIG. 3, the data backed-up computer system 100 is formed of a host computer 30 communicating with a data backup tape drive 22 via a backup data/communication path 31. The tape drive 22 has tape read/write hardware 24 for receiving a data tape 23 at slot 24A. The tape drive 22 also has firmware contained in a firmware memory 25 and a data memory 26 which are part of the embedded application computer 90 forming a specialized system for use with the hardware 24. Significantly, the tape drive 22 also contains a snapshot dump system 91 comprising error trigger detectors 27, a snapshot dump initiator 28, and a snapshot dump memory 29.

It should be understood that the data tape 23 of course may be other types of storage media, removable or non-removable, and that the hardware may be hardware other than a tape read/write hardware but which has a specialized embedded application computer associated with it.

FIG. 4 shows steps performed by the snapshot dump system 91 of FIG. 3 in detail. Although different kinds of trigger detectors 27 may be employed, as shown in FIG. 4 a hard error trigger detector 27A, a firmware trap trigger detector 27B, a soft error trigger detector 27C, a degraded media fault error trigger detector 27D, and a host system error trigger detector 27E may be provided.

The hard error trigger detector 27A will sense for a termination with defined error handling. The current operation or command will be terminated but the Drive will accept new commands and operate accordingly.

The firmware trap trigger detector 27B detects termination with no error handling. In other words, the tape drive simply stops and no longer functions according to specifications. The host computer may have lost normal contact and even attempts to reset the Drive may fail. If the Host manages to get the drive reset and alive again it may have problems with reading or using the media.

The soft error detector 27C detects a softer problem—that is the problem level is not as high as the hard error. One example of such a soft error problem would be an error rate for reading or writing exceeding a maximum permitted error rate. Thus the detector senses for the error rate being exceeded.

The degraded media fault error trigger detector 27D triggers based on statistical measurements and usage/wear of the system. Here the system triggers either a media error or a drive error.

For the host system error trigger detector 27C, the detector senses that the host system is sending the wrong commands or sequence of commands. These wrong commands or sequence of commands from the host system may be sensed at various appropriate points within the firmware.

The snapshot dump initiator 28 is activated by signals from any one or more of the detectors 27A, 27B, 27C, 27D, and 27E. The snapshot dump initiator 28 triggers a snapshot dump at the time of the occurrence of the error. This snapshot dump, for example, may include a dump of one or more of the following memory locations of the firmware and/or data memories 16, 17 inside the tape drive: hardware register map contents 36; CPU data RAM 37; event management logs 38; media management logs 39; request sense 150, and/or media statistics 151.

Significantly, one or more of these memory locations contain information occurring at the time of the failure and/or information prior to and after the failure. This information is highly useful in performing the failure analysis because the information being dumped occurs before, at the time, or directly after the failure. This is particularly true of ring buffer memory locations which are being continually rewritten after given time periods by new information, thus destroying information after a certain period of time.

The hardware register map contents 36 may include ring buffer memory locations containing information, which is repeatedly updated. It may also include snapshot information at the time of failure. Also the CPU data RAM 37 may include current and historical information and also may include buffer memories covering different processes occurring in the tape drive. Also the event and media management logs may include several buffers containing historical and current information at the time of the failure.

Also, if desired, request sense information memory location 150 and media statistics information memory location 151 may be dumped, The information dumped from the tape drive memory locations are stored in a snapshot dump non-volatile memory 29 of the drive. Alternatively, this information may also be stored on the data tape, or in the host system as described hereafter.

The amount of information to be dumped may depend, of course, on the size of the non-volatile memory and also the time periods over which the information is being dumped.

When a failure occurs, the tape drive 22 with the snapshot dump system 91 is returned to the vendor laboratory for analysis, for example. The tape drive may be replaced by another tape drive so that the user's host computer still has data backup. Thus the user's operation is not interfered with. Also, by removing the tape drive to a failure analysis laboratory, the problems can be analyzed in a convenient timely manner without interfering with the users.

Figure 5:
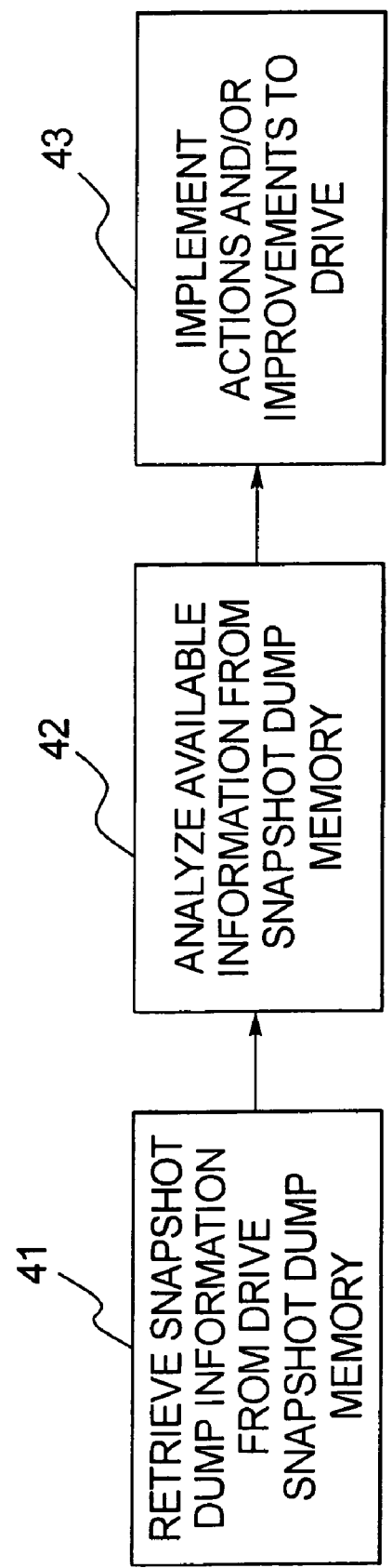
FIG. 5 is a block diagram illustrating the simplified failure analysis process by using the snapshot dump system.

As shown in FIG. 5 in step 41 at the laboratory (or possibly at the user's location), the snap dump information is retrieved from the snapshot non-volatile storage as shown at 41. Thereafter, at 42 the available information from the snapshot dump drive memory is analyzed. Thereafter at 43, actions and/or improvements to the drive may be implemented.

The snapshot dump memory 29 may be available space (if sufficient) in an existing flash memory or a new flash memory of the tape drive 22. Using this approach provides a high possibility of safely storing the information in the tape drive. Thus, the information will be available in the failed tape drive, which is returned to the laboratory for analysis and thus carries important information used for the failure analysis.

Another storage possibility is to use the media, that is the data tape 23, for example, as a permanent storage. One advantage of using this method is a simple way of getting the dump information out from the tape drive without having to remove the tape drive from its installation. By selecting this method, an area of a header of the media is defined to protect ordinary data from being damages. The risk of this approach is that this method might not work in a critical situation when read/write functionality is the problem.

Another option to consider is to send the snapshot dump information to the host or another host—most probably using the serial interface on a service port of the tape drive. The advantage of this method is unlimited storage. This method however is not possible in many field situations, but for some special types of setups it may be useful to have the snapshot dump initiate and to have no limitations regarding the amount of the information to be dumped.

Thus with the snapshot dump system of the preferred embodiment, the system is provided as an embedded tool which activates, controls, and stores snapshot dump information. The system automatically triggers when an error occurs to collect the snapshot dump information which is stored permanently in a non-volatile storage. The dump is based on an intelligent selection of information collected prior to the point-in-time the problem actually occurs.

The snapshot dump catches valuable information when a problem occurs but does not require external tools or software applications in order to complete the operation.

The snapshot dump at the time of failure thus plays a key role in providing the failure analysis with detailed information about problems by catching the true events that are causing users to have problems with the tape drive.

While a preferred embodiment has been illustrated and described in detail in the drawings and foregoing description, the same is to be considered as illustrative and not restrictive in character, it being understood that only a preferred embodiment has been shown and described and that all changes and modifications that come within the spirit of the invention both now or in the future are desired to be protected.

I claim as my invention:

1. A computer system with data backup, comprising:
    a data backup removable media drive system for backing up data of the host computer to which the drive system is connected;
    read/write hardware for reading and writing data from and to a removable storage media of the drive system;
    an embedded application computer of the drive system comprising a firmware memory which stores firmware, and a data memory which stores data;
    a snapshot dump system of the drive system comprising an error trigger detector system which detects errors, and a snapshot dump initiator responsive to the trigger detector system;
    a non-volatile snapshot dump memory receiving information from memory locations stored at a time at which said error is detected; and
    said error trigger detector system comprising a hard error trigger detector wherein a current operation is terminated but new commands are accepted, a soft error trigger detector which detects a problem level which is not as high as for the hard error trigger detector, and a firmware trigger detector where the drive system stops.

2. A system of claim 1 wherein the read/write hardware is for reading and writing with respect to a data tape.

3. A system of claim 1 wherein the error trigger detector system further comprises a degraded media fault error trigger detector which triggers based on either a media error or drive error, and a host system error trigger detector sensing that a host system is sending wrong commands or wrong sequence of commands.

4. A system of claim 1 wherein the snapshot dump initiator initiates a dump from at least one of hardware register map contents, CPU data RAM, event management log, media management log, request sense, and media statistics memory locations.

5. A system of claim 1 wherein the snapshot dump memory stores information in memory locations both before and after when the error is detected.

6. A system of claim 1 wherein the snapshot dump memory comprises an available memory in the drive system.

7. A system of claim 6 wherein the available memory comprises a flash memory.

8. A system of claim 1 wherein said snapshot dump memory comprises employing the media as a permanent storage.

9. A system of claim 1 wherein the dump memory is not provided in the drive system but rather employs at least a portion of a memory in the host computer.

10. A method for failure analysis, comprising the steps of:
    providing a data backup drive system having a removable data storage media for backing up data of a host computer where the drive system has an embedded specialized system application as a firmware stored in a firmware memory;
    with a snapshot dump system associated with the drive system, detecting for an error;
    upon detection of said error with the snapshot dump system, initiating a snapshot dump from memory locations of the drive system providing information about conditions occurring just prior to and during the detection of said error;
    storing said dumped information in a dump memory; and
    for detection of said error providing a hard error trigger detector wherein a current operation is terminated but new commands are accepted, a soft error detector which detects a problem level which is not as high as for the hard error trigger detector, and a firmware trigger detector where the drive system stops.

11. A method of claim 10 wherein the dump memory comprises a non-volatile memory in the drive system.

12. A method of claim 10 wherein the dump memory comprises at least a portion of a memory in the host computer.

13. A method of claim 10 wherein the dump memory is not provided in the drive system but rather employs at least a portion of a memory in the host computer.

14. A method of claim 10 wherein for detection of said error also providing a degraded media fault error trigger detector which triggers based on either a media error or drive error, and a host system error trigger detector which senses that the host computer is sending wrong commands or a wrong sequence of commands.

15. A method of claim 10 wherein the snapshot dump dumps information contained in at least one of hardware register map contents, CPU data RAM, event management log, medium management log, request sense, and media statistics memory locations.

16. A method of claim 10 wherein the media comprises a removable data tape and the drive comprises a tape drive.

17. A method of claim 10 wherein when a failure occurs, the drive system is removed from a vicinity of the host computer and is analyzed using the information contained in the snapshot dump memory at a location remote from the host computer in order to implement an appropriate action to cure the error which occurred.

18. A computer system with data backup, comprising:
    a host computer and a data backup removable media drive system for backing up data of the host computer to which the drive system is connected;
    read/write hardware for reading and writing data from and to a removable storage media of the drive system;
    an embedded application computer of the drive system comprising a firmware memory which stores firmware, and a data memory which stores data;

a snapshot dump system of the drive system comprising an error trigger detector system which detects errors, and a snapshot dump initiator responsive to the trigger detector system;

a non-volatile snapshot dump memory receiving information from memory locations stored at a time at which said error is detected; and said snapshot dump initiator initiating a dump from drive hardware register map contents, drive CPU data RAM, and drive event management log memory locations.

19. A system of claim 18 wherein the read/write hardware is for reading and writing with respect to a data tape.

20. A system of claim 18 wherein the error trigger detector system comprises at least one of a hard error trigger detector, a firmware trap trigger detector, a soft error trigger detector, a degraded media fault error trigger detector, and a host system error trigger detector.

21. A system of claim 18 wherein the snapshot dump initiator also initiates a dump from a drive media management log, drive request sense, and drive media statistics memory locations.

22. A system of claim 18 wherein the snapshot dump memory stores information in memory locations both before and after when the error is detected.

23. A system of claim 18 wherein the snapshot dump memory comprises an available memory in the drive system.

24. A system of claim 23 wherein the available memory comprises a flash memory.

25. A system of claim 18 wherein said snapshot dump memory comprises employing the media as a permanent storage.

26. A system of claim 18 wherein the dump memory is not provided in the drive system but rather employs a portion of a memory in the host computer.

27. A method for failure analysis, comprising the steps of:
providing a data backup drive system having a removable data storage media for backing up data of a host computer where the drive system has an embedded specialized system application as a firmware stored in a firmware memory;

with a snapshot dump system associated with the drive system, detecting for an error;

upon detection of said error with the snapshot dump system, initiating a snapshot dump from memory locations of the drive system providing information about conditions occurring just prior to and during the detection of said error; pg,17 storing said dumped information in a dump memory; and said snapshot dump initiator initiating a dump from drive hardware register map contents, drive CPU data RAM, and drive event management log memory locations.

28. A method of claim 27 wherein the memory comprises a non-volatile memory associated with the drive.

29. A method of claim 27 wherein the dump memory is contained in the media.

30. A method of claim 27 wherein the error which triggers the snapshot dump comprises at least one of a hard error, a firmware trap error, a soft error, a degraded media error, and a host system error.

31. A method of claim 27 wherein the snapshot initiator also initiates a dump from drive media management log, drive request sense, and drive media statistics memory locations.

32. A method of claim 27 wherein the media comprises a removable data tape and the drive system comprises a tape drive.

33. A method of claim 27 wherein when a failure occurs, the drive system is removed from a vicinity of the host computer and is analyzed using the information contained in the snapshot dump memory at a location remote from the host computer in order to implement an appropriate action to cure the error which occurred.

* * * * *